United States Patent

Kouhei et al.

[11] Patent Number: 5,824,904
[45] Date of Patent: Oct. 20, 1998

[54] ACCELERATION SENSOR USING A PIEZOELECTRIC ELEMENT

[75] Inventors: Tohru Kouhei; Takahiro Imamura, both of Kawasaki, Japan

[73] Assignee: Fujitsu Limited, Kawasaki, Japan

[21] Appl. No.: 746,745

[22] Filed: Nov. 15, 1996

Related U.S. Application Data

[63] Continuation of Ser. No. 403,377, Mar. 15, 1995, abandoned.

[30] Foreign Application Priority Data

Mar. 15, 1994 [JP] Japan .................................. 6-043875

[51] Int. Cl.⁶ ..................................................... G01P 15/09
[52] U.S. Cl. ......................................... 73/514.34; 210/357
[58] Field of Search ............................ 73/514.34, DIG. 4; 210/357, 329

[56] References Cited

U.S. PATENT DOCUMENTS

| | | | |
|---|---|---|---|
| 3,739,202 | 6/1973 | Cady ...................................... | 73/514.34 |
| 4,088,907 | 5/1978 | Jones et al. .............................. | 310/333 |
| 4,692,915 | 9/1987 | Moriya et al. ............................. | 369/53 |
| 5,128,581 | 7/1992 | Nakayama et al. ..................... | 73/514.34 |
| 5,178,012 | 1/1993 | Culp ......................................... | 73/510 |
| 5,481,915 | 1/1996 | Tabota et al. ........................... | 73/514.34 |
| 5,495,760 | 3/1996 | Wirt ........................................ | 73/504.13 |

FOREIGN PATENT DOCUMENTS

| | | | |
|---|---|---|---|
| 550037 | 7/1993 | European Pat. Off. ............. | 73/514.34 |
| 616221 | 9/1994 | European Pat. Off. ............. | 73/514.34 |
| 3-20672 | 1/1991 | Japan .................................. | 73/514.34 |
| 5288768 | 11/1993 | Japan . | |
| 5322915 | 12/1993 | Japan . | |
| 6-58953 | 3/1994 | Japan .................................. | 73/514.34 |

*Primary Examiner*—Christine K. Oda
*Attorney, Agent, or Firm*—Greer, Burns & Crain, Ltd.

[57] ABSTRACT

An acceleration sensor is provided which has a plurality of piezoelectric elements having polarization directions which are different from the direction of the acceleration to be detected and which have electrodes provided on both sides are mounted to a substrate, or a singly formed piezoelectric element having a plurality of polarizations with independent electrodes provided for each region is mounted to a substrate, a series electrical connection being made between the substrate side electrodes and the free end electrodes of the piezoelectric elements, the electrodes between which the piezoelectric element are series connected being led out to two electrodes provided on the substrate, and a weight being mounted over and such a manner as to straddle the plurality of piezoelectric elements or singly formed piezoelectric element. When an acceleration acts on this acceleration sensor, the force of inertia of the weight applies a stress to each piezoelectric element, causing the generation of a voltage. Because the piezoelectric elements are connected in series, the voltage that is generated at each piezoelectric element is a voltage corresponding to the superimposition of the acceleration to which each of the piezoelectric element or each region of a singly formed piezoelectric element is subjected. As a result, it is possible to simplify and make smaller the configuration of the acceleration sensor and further possible to achieve an acceleration sensor with a large output.

8 Claims, 17 Drawing Sheets

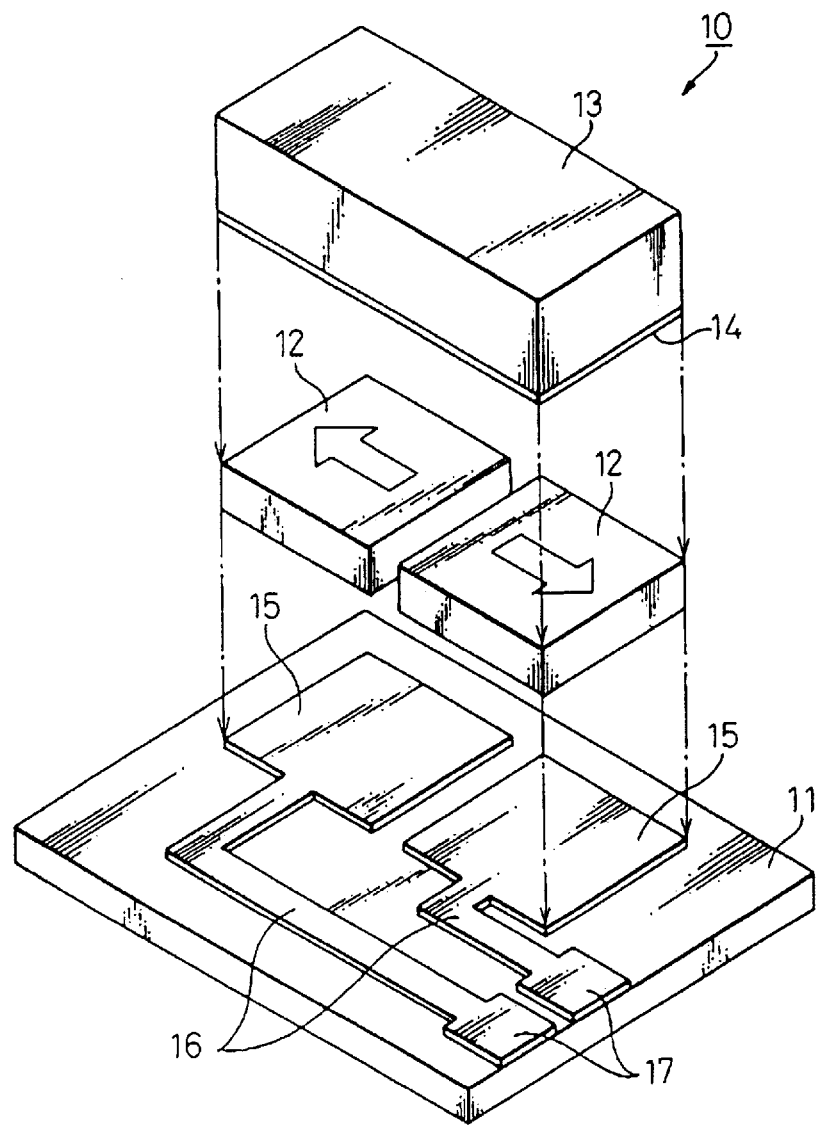

DIRECTION OF
DETECTING AN
ACCELERATION

ACCELERATION SENSOR USING A PIEZOELECTRIC ELEMENT

This application is a continuation of application Ser. No. 08/403,377 filed on Mar. 15, 1995 now abandoned.

BACKGROUND OF THE INVENTION

1. Field of the Invention

The present invention relates to an acceleration sensor, and more specifically to an acceleration sensor formed from a flat piezoelectric element with a weight mounted on its free end, wherein when the sensor is subject to externally applied acceleration the inertial force of the weight applies a stress to the piezoelectric element, this stress causing a voltage or electrical charge to be developed in the piezoelectric element, this being used to detect the amount of the applied acceleration.

2. Description of the Related Art

With the shrinking in size of equipment used in the automation of offices and laboratories, there is a desire to have equipment continue to operating precisely, even if it is subjected to a slight amount of vibration. To achieve this, it is necessary to detect the acceleration to which the equipment is subjected and to perform control in accordance with the received acceleration. To detect the acceleration that the equipment receives, it is necessary to mount an acceleration sensor on the equipment.

There are two widely known methods of detecting the acceleration that equipment receives and controlling the equipment in a manner that eliminates the effect of the acceleration: (1) the method that is used to feed back the recoil from the seek operation in a magnetic disk drive to a head position controller, and (2) the method that is used to feed back the acceleration due to a hand shaking when holding a video camera.

Recently a widely known method is being used in the disk drives of portable personal computers, the acceleration being monitored, and when the equipment is subjected to external acceleration the writing of data is interrupted, thereby preventing improper writing of data onto an adjacent track.

However, the sensors in prior art equipment in which the acceleration the equipment receives was detected were large (particularly in the height direction), thereby presenting problems in mechanism design. Therefore, as reductions are made in cost and size of the equipment, there is a need for a thin acceleration sensor which features immunity to shock, ease of manufacture, and also the ability to be mounted directly to a printed circuit board.

To meet this need, an acceleration sensor has been proposed, as disclosed in Japanese Examined Patent Publication No. 64-41865, for the detection of the acceleration received by equipment, this sensor consisting of a piezoelectric element onto which is placed a weight, this being mounted to the bottom of a metallic housing, so that inertial force is developed by the weight when the sensor is subject to external acceleration, the inertial force of the weight applying a stress to the piezoelectric element, which in response generates a voltage, the voltage across the electrodes on the two sides of the piezoelectric element being led outside by means of leads and a metallic housing.

Another acceleration sensor has been proposed, as disclosed in Japanese Examined Patent Publication No. 1-112468, this acceleration sensor comprising a piezoelectric element which is polarized in a direction perpendicular to the electrode surface and two piezoelectric elements which are polarized in parallel directions, the respective directions of polarization being made to intersect, the acceleration sensor mounted to the device under measurement with the junction surface disposed between the electrodes, weight 3 being mounted to the free end, so that acceleration in each of the X, Y, and Z directions is detected.

However, in an acceleration sensor having the above-noted configuration, the usual method of accessing the voltage from the electrodes of the piezoelectric element is by means of direct leads from the front and back sides of the piezoelectric element, and because this makes no provisions for the direct mounting of the acceleration sensor itself to a printed circuit board, mounting of the acceleration sensor to a printed circuit board required considerable time. Furthermore, recently acceleration sensors which make use of a surface-mounted bimorph cantilever type piezoelectric element or a bimorph piezoelectric element supported at both ends have become known, and in this type acceleration sensor, although the detection sensitivity is high, the strength is low, and the sensor may be subject to damage by externally applied shock.

To solve these problems, in an acceleration sensor in which a flat weight is mounted to a flat piezoelectric element, the piezoelectric element is laminated onto a substrate, electrical connections to the uppermost electrode and electrode on the substrate being made by means of a via hole formed as part of the piezoelectric element or a lead, has been disclosed in Japanese Unexamined Patent Publication No. 5-221181.

However, in the sensor disclosed in Japanese Unexamined Patent Publication No. 5-221181, the rigidity of the via hole formed in the piezoelectric element can influence the output, leading to a worsening of the S/N ratio. In addition, the work of wiring the leads and the formation of the via hole increases the number of fabrication steps required in making the acceleration sensor, thereby increasing the cost of the acceleration sensor.

SUMMARY OF THE INVENTION

An object of the present invention is to provide an easy-to-fabricate acceleration sensor with a configuration that is both simple and compact, this acceleration sensor achieving a large output.

According to the present invention, an acceleration sensor using at least one piezoelectric element is provided, this acceleration sensor having a singly formed piezoelectric element in which there are a plurality of polarization directions which mutually differ in their direction with respect to the acceleration which is to be measured, these being spatially separated into different regions within a single element, a weight made of an insulating material which straddles the entire region of the piezoelectric element, and an electrical connection means which is provided on the weight side and the substrate side of the piezoelectric elements and which makes direct connection to the plurality of regions of the piezoelectric element, electrodes which extract the voltage from across the two ends of the piezoelectric elements, to which they are electrically connected, being provided on the substrate.

The singly formed piezoelectric element may be divided into a plurality of piezoelectric elements according to a plurality of regions.

In the case in which not only are the polarization directions of the above-noted plurality of piezoelectric elements or the above-noted single formed piezoelectric element within the plane of the element, but also at least one group of polarization directions is mutually opposed, it is possible to detect the acceleration which acts in a direction within the plane of the above-noted substrate to which the plurality of piezoelectric elements or the above-noted single formed piezoelectric element is mounted.

In the case in which not only are the polarization directions of the above-noted plurality of piezoelectric elements or the above-noted single formed piezoelectric element within the plane of the element, but also at least one group of polarization directions is mutually parallel, when the above-noted substrate is rotated about an axis which is perpendicular to the substrate, it is possible to detect the acceleration which acts about that rotational axis.

In the case in which not only are the polarization directions of the above-noted plurality of piezoelectric elements or the above-noted single formed piezoelectric element in the thickness direction of the element, but also at least one group of polarization directions is mutually opposed, it is possible to detect the acceleration which acts in a direction perpendicular to the above-noted substrate.

In the case in which the polarization directions of the above-noted plurality of piezoelectric elements or the above-noted single formed piezoelectric element include those which are not only within the plane of the element but also all mutually different as well as those which are in the thickness direction of the element, it is possible to detect six axes of acceleration, consisting of acceleration in the directions of the X, Y, and Z axes and rotational acceleration about these three axes.

In the case in which the above-noted plurality of piezoelectric elements or the above-noted single formed piezoelectric element has an even number of polarization directions, with each polarization direction being disposed in a circular manner with respect to an axis that is perpendicular to the above-noted substrate and with adjacently contacting polarization directions being mutually opposing, it is possible to detect the acceleration which acts rotationally about the above-noted axis.

In the case in which there are either two groups of the above-noted pluralities of piezoelectric elements or two groups of regions in the above-noted singly formed piezoelectric element which have mutually differing polarization directions, by making the above-noted weight from an electrically conductive material, it is possible to form the above-noted connection means as one with the weight. It is further possible to make an electrical connection between the above-noted electrical connection means, electrodes, and piezoelectric element by means of either a solder layer or an electrically conductive adhesive material. It is also possible to make the above-noted weight from the same material as the piezoelectric element.

In an acceleration sensor according to the present invention, because the piezoelectric element disposed between the weight and the substrate are connected in series, with consideration given to the polarization directions with respect to the direction of acceleration that is to be detected, the outputs of each of the piezoelectric elements are added and appear at the electrode. As a result, the output occurring when an acceleration is received is large. Also, because a series connection is made, either at the conductor at the bottom surface of the weight or at the weight, between the plurality of piezoelectric elements or between the regions within a singly formed piezoelectric element having differing polarization directions, there is need for neither a via hole nor a lead wire. For this reason, the S/N ratio of the output signal is high, and the number of steps required to fabricate the acceleration sensor is reduced. In addition, because the piezoelectric elements are arranged in a plane, it is possible to make the sensor thin, enabling the achievement of a simple, thin, low-cost acceleration sensor.

BRIEF DESCRIPTION OF THE DRAWINGS

The present invention will be more clearly understood from the description as set forth below, with reference to the accompanying drawings, which are as follows.

FIG. 3 is a perspective view which shows the configuration of an acceleration sensor according to the first embodiment of the present invention.

DESCRIPTION OF THE PREFERRED EMBODIMENTS

Figure 1:
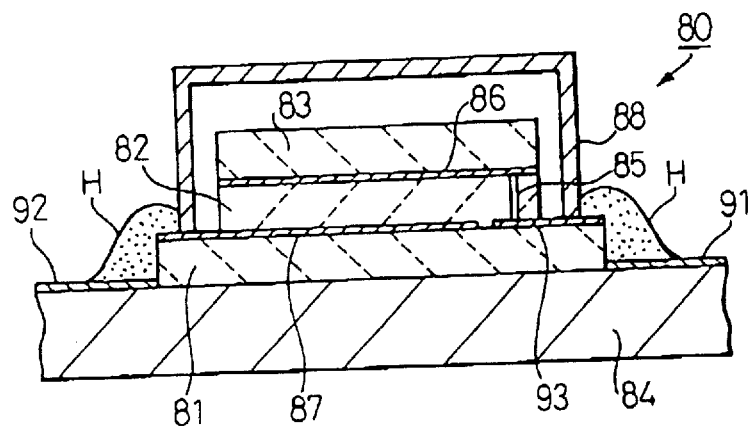
FIG. 1 is a cross-sectional view which shows the configuration of an acceleration sensor of the prior art, in which a via hole is used.
Figure 2:
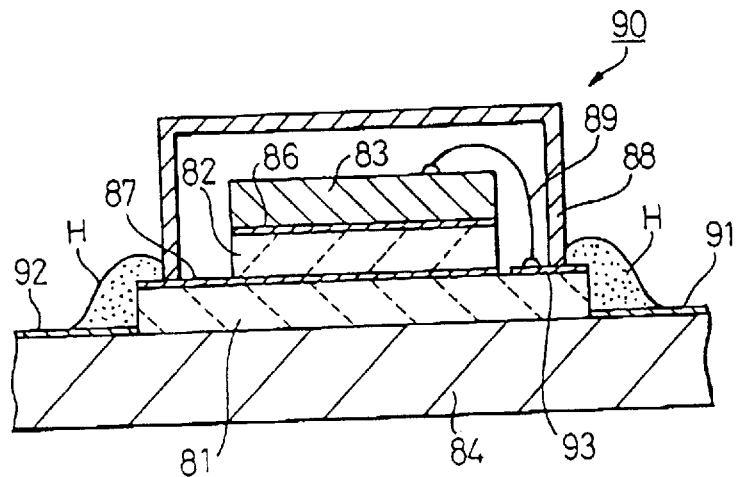
FIG. 2 is a cross-sectional view which shows the configuration of an acceleration sensor of the prior art, in which a lead wire is used.

Before describing the preferred embodiments of the present invention, an explanation will be presented of the conventional acceleration sensor which uses a piezoelectric element, as shown in FIG. 1 and FIG. 2.

FIG. 1 shows the configuration of the acceleration sensor 80, which is disclosed in Japanese Unexamined Patent Publication No. 5-221181. The acceleration sensor 80 is mounted onto a printed circuit board 84, onto which a circuit pattern 91 is provided, by means of solder H. The acceleration sensor 80 has a substrate 81, a piezoelectric element 82, a weight 83, and a cover 88. The bottom surface electrode 87 of the piezoelectric element 82 is formed on the top surface of the substrate 81, this bottom surface electrode 87 being connected to the circuit pattern 92 on the top of the printed circuit board 84 by means of the solder H. An external terminal electrode 93 is formed on the top surface of the substrate 81, this being distinct from the bottom surface electrode 87 and this external terminal electrode 93 being connected to the circuit pattern 91 on the top of the printed circuit board 84 by means of solder E. In addition, a top surface electrode 86 is formed between the piezoelectric element 82 and the weight 83, this top surface electrode being connected to the external terminal electrode 93 by means of a via hole which passes through the piezoelectric element 82. Cover 88 is mounted on the top of the substrate 81, and acts to shield the piezoelectric element 82 and the weight 83 from the outside.

In the acceleration sensor 80 as shown in FIG. 1, when a force of inertia acts on the weight 83 because of an applied acceleration, stress acts upon the piezoelectric element 82, resulting in a voltage developing between the top surface electrode 86 and the bottom surface electrode 87, this voltage passing via the circuit patterns 91 and 92 to the outside so as to detect the acceleration.

FIG. 2 shows the configuration of another acceleration sensor 90 disclosed in Japanese Unexamined Patent Publication No. 5-221181. In the acceleration sensor 80 shown in FIG. 1, the top surface electrode 86 at the very top is electrically connected to the external terminal electrode 93 on substrate 81 by means of a via hole 85 which passes through the piezoelectric element 82. In the acceleration sensor 90 shown in FIG. 2, however, the top surface electrode 86 at the very top is electrically connected to the external terminal electrode 93 on substrate 81 by means of a led wire 89 and the conductive weight 83. With the exception of this point, the acceleration sensor 90 has the same construction as the acceleration sensor 80, and is capable of detecting acceleration in the same manner as the acceleration sensor 80.

However, in the acceleration sensor 80, which is disclosed in Japanese Unexamined Patent Publication No. 52-21181, the rigidity of the via hole 85 which is formed so as to pass fully through the piezoelectric element 82 affects the output, and this can cause a worsening of the S/N ratio. In addition in the acceleration sensor 90, which is disclosed in Japanese Unexamined Patent Publication No. 5-221181, the rigidity and mass of the lead wire 89, which connects the top surface electrode 86 and the external terminal electrode 93 also affects the output, and this can cause a worsening of the S/N ratio. In addition to this problem, the work of making a connection with the lead wire 89 and of forming the via hole 85 increase the labor and cost involved in fabrication of the acceleration sensor.

Figure 4A:
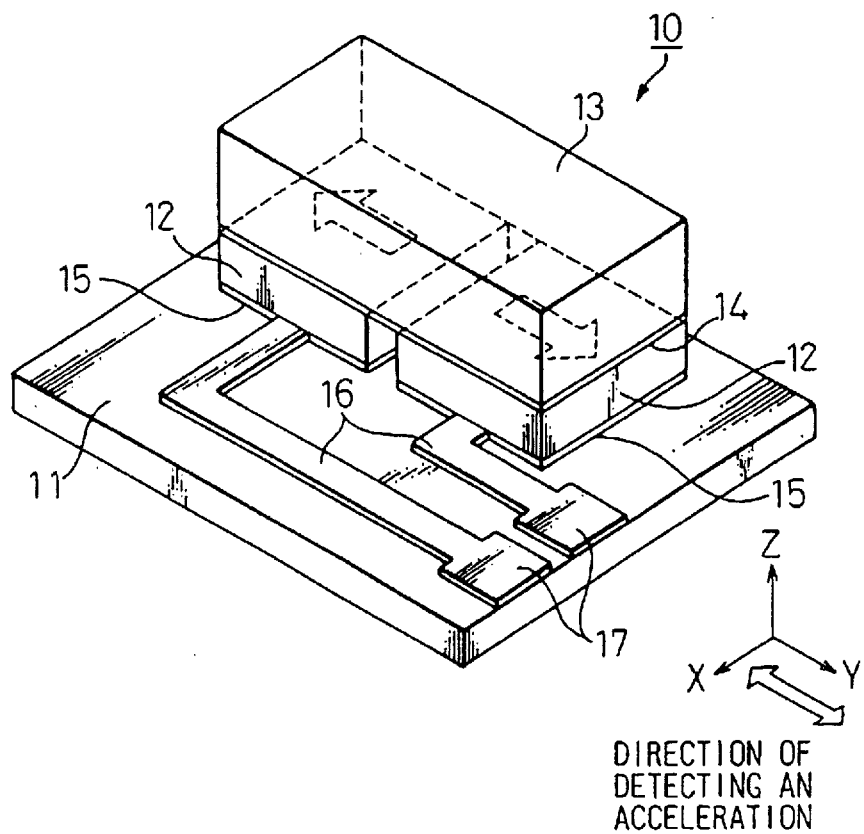
FIG. 4A is a perspective view which shows an overall view of an acceleration sensor according to the first embodiment of the present invention, including the acceleration detection directions.

FIG. 3 is an exploded view which shows the configuration of an acceleration sensor 10 according to the first embodiment of the present invention. FIG. 4A is a perspective view which shows both the overall acceleration sensor 10 after assembly and the acceleration detection directions.

In the first embodiment of the present invention, two conductive rectangles 15 are formed so as to line up lined up on the top of a substrate 11, and two electrodes 17 are formed at the edge of the substrate 11. These two conductive rectangles 15 are each extended and connected to the electrodes 17 by means of the conductive lines 16. A shear-type piezoelectric element having a rectangular bottom surface approximately the same shape as the conductive rectangles 15 is mounted on top of each of the conductive rectangles 15. The polarization direction of each of these shear-type piezoelectric elements 12 is disposed both within the plane of the elements, which are parallel to the substrate 11, and in mutually opposite directions. A weight 13 is mounted above these piezoelectric elements 12 so that it straddles the two piezoelectric elements 12. In this embodiment, because the weight 13 is made of an insulating material, a conductor 14, which makes electrical connection with the two piezoelectric elements 12 is provided on the bottom surface of the weight 13. That is, the separate conductor 14 may be inserted between the bottom surface of the weight 13 and the top surfaces of the two piezoelectric elements 12.

Therefore, in its assembled condition, in the acceleration sensor 10 of this embodiment, as shown in FIG. 4A, the two piezoelectric elements 12 are electrically connected in series by the conductor 14. Thus, in the acceleration sensor 10 according to this embodiment, the two ends of the two series connected piezoelectric elements 12 are extended by means of the conductive lines 16 and connected to the two electrodes 17.

In FIG. 3 and FIG. 4A, to simplify the explanation, the solder layers and conductive adhesive layers which make connections between various parts in the drawings have been omitted from both the drawings and the explanations thereof. The solder layer and conductive adhesive layer will be explained at the very end.

The acceleration sensor 10 according to this embodiment is capable of detecting acceleration which is parallel to the polarization direction of the two shear-type piezoelectric elements 12. That is, in the case in which the two acceleration sensors 12 are disposed so as to be parallel to the Y axis, they are capable of detecting acceleration parallel to the Y axis.

Figure 4B:
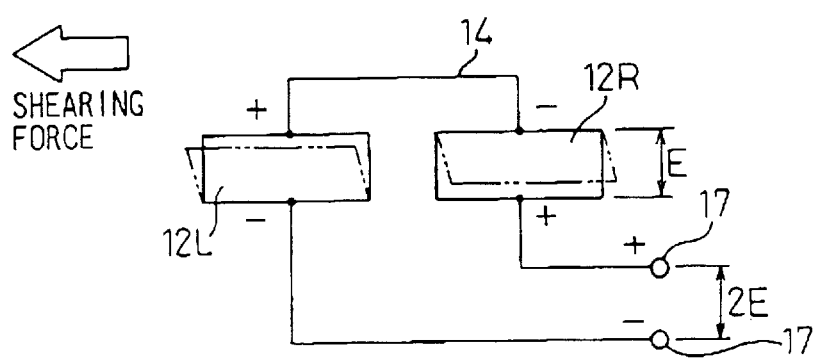
FIG. 4B is a drawing which illustrates the electrical model of the acceleration sensor shown in FIG. 4A.

FIG. 4B shows the electrical model of the acceleration sensor 10. If, for example, a shearing force is applied as shown in this drawing, in the direction from right to left, so that a positive potential (+) is developed on the top of the left piezoelectric element 12L and a negative potential (−) is developed on the top of the right piezoelectric element 12R, because the polarization direction of the right piezoelectric element 12R is opposite the polarization direction of the left piezoelectric element 12L, a positive potential (+) develops on the top surface, while a negative potential (−) develops on the bottom surface. If the potential difference generated in a piezoelectric element 12 is E, because the right piezoelectric element 12R and the left piezoelectric element 12L are electrically connected by means of the conductor 14, there is a potential difference of 2E which develops across the electrodes 17.

In this manner, if the acceleration is accessed in the form of the voltage from two piezoelectric element, having opposite polarization directions and being electrically connected in series, located under the weight 13, the potential developed is twice the potential that would be developed in the case in which the voltage is accessed from the top and bottom of one piezoelectric element located under the weight 13, thereby doubling the acceleration detection sensitivity.

Figure 5:
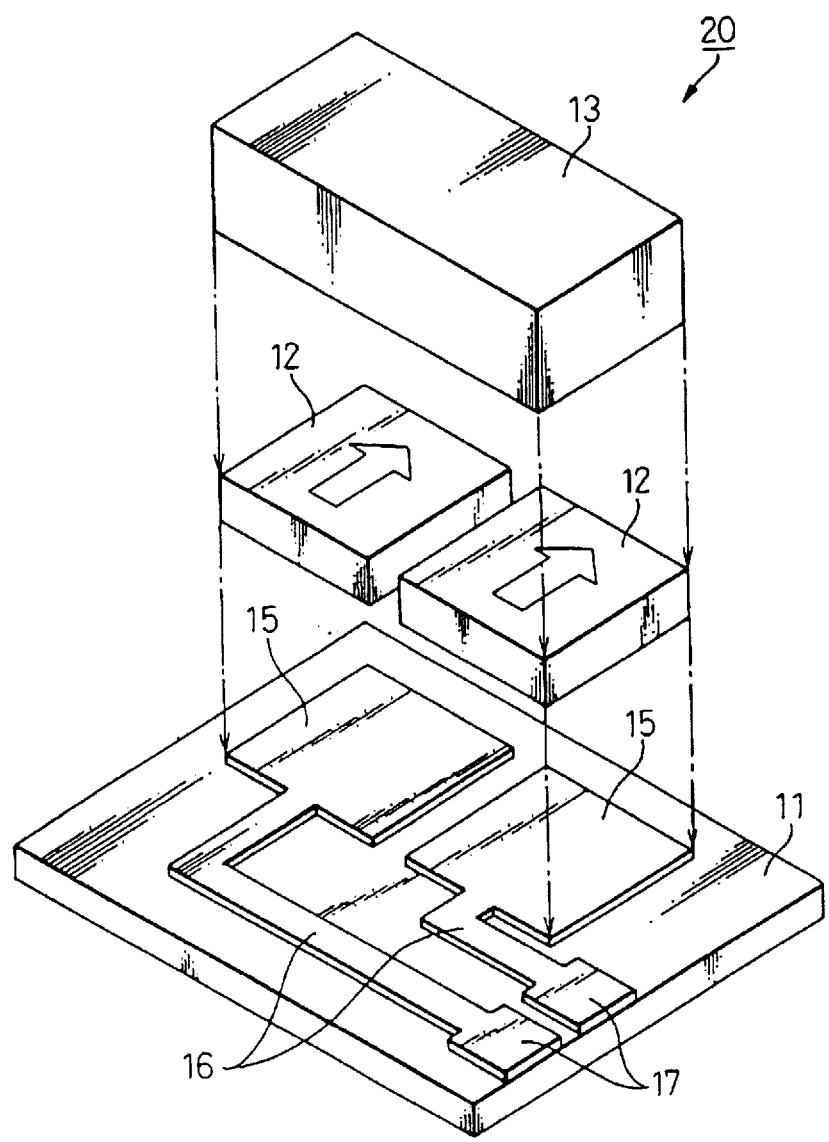
FIG. 5 is a perspective view which shows the configuration of an acceleration sensor according to the second embodiment of the present invention.
Figure 6:
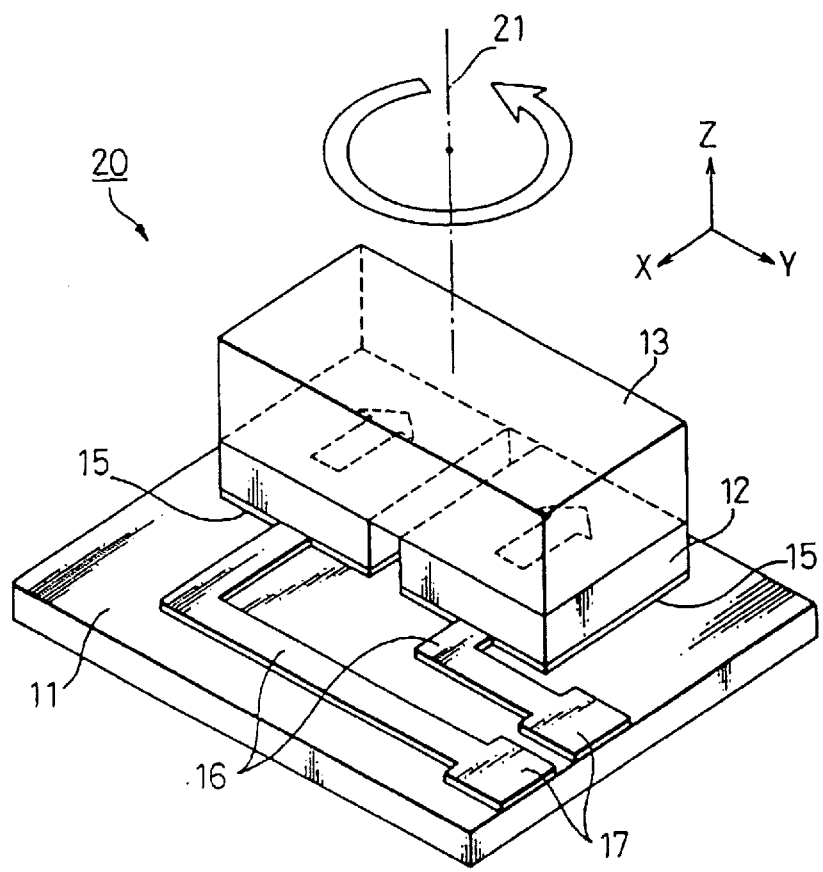
FIG. 6 is a perspective view which shows the overall configuration and acceleration detection directions of an acceleration sensor according to the second embodiment of the present invention.

FIG. 5 is an exploded view which shows the configuration of an acceleration sensor 20 according to the second embodiment of the present invention. FIG. 6 is a perspective view which shows both the overall acceleration sensor 20 after assembly and the acceleration detection directions.

In the second embodiment of the present invention, because the constituent elements of the acceleration sensor 20 are chiefly the same as the acceleration sensor 10 according to the first embodiment of present invention, the same reference symbols are applied to corresponding elements and the description of these elements will be omitted herein, a detailed description being provided of only those parts that differ from the first embodiment of the present invention.

In the acceleration sensor 20 according to the second embodiment, which is shown in FIG. 5, 12 are shear-type piezoelectric elements, 13 is a weight, 15 are conductive rectangles, 16 are conductive lines, and 17 are electrodes.

The difference in the acceleration sensor according to the second embodiment of the present invention from the first embodiment are the polarization direction of the shear-type piezoelectric elements 12 and the material from which the weight 13 is fabricated In the acceleration sensor 20 according to the second embodiment of the present invention, the polarization directions of two shear-type piezoelectric elements 12 are within the plane of the piezoelectric elements which are parallel to the substrate 11. A weight 13 is formed from a conductive material and mounted over the piezoelectric elements 12 so as to straddle the piezoelectric elements 12. In this embodiment, therefore, the top surfaces of the two piezoelectric elements 12 are electrically connected by means of the weight 13.

In the acceleration sensor according to this embodiment, as shown in FIG. 6, the piezoelectric elements 12, which have polarization directions which are located within the plane of elements which are parallel to one another, are connected by means of the weight 13. Therefore, the acceleration sensor 20 of this embodiment is able to detect acceleration in the Z-axis direction, which is perpendicular to the substrate 11 and which passes between the two piezoelectric elements 12.

Figure 7:
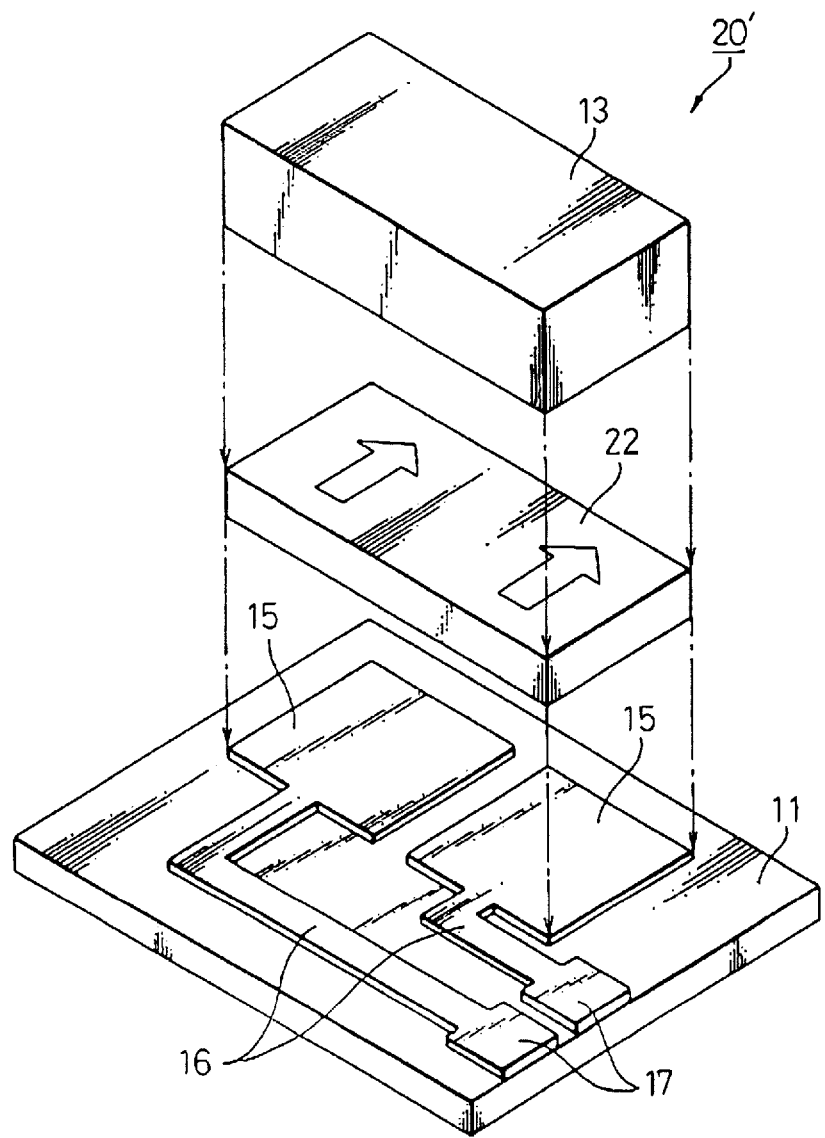
FIG. 7 is a perspective view which shows the overall configuration of a variation of an acceleration sensor according to the second embodiment of the present invention.
Figure 8:
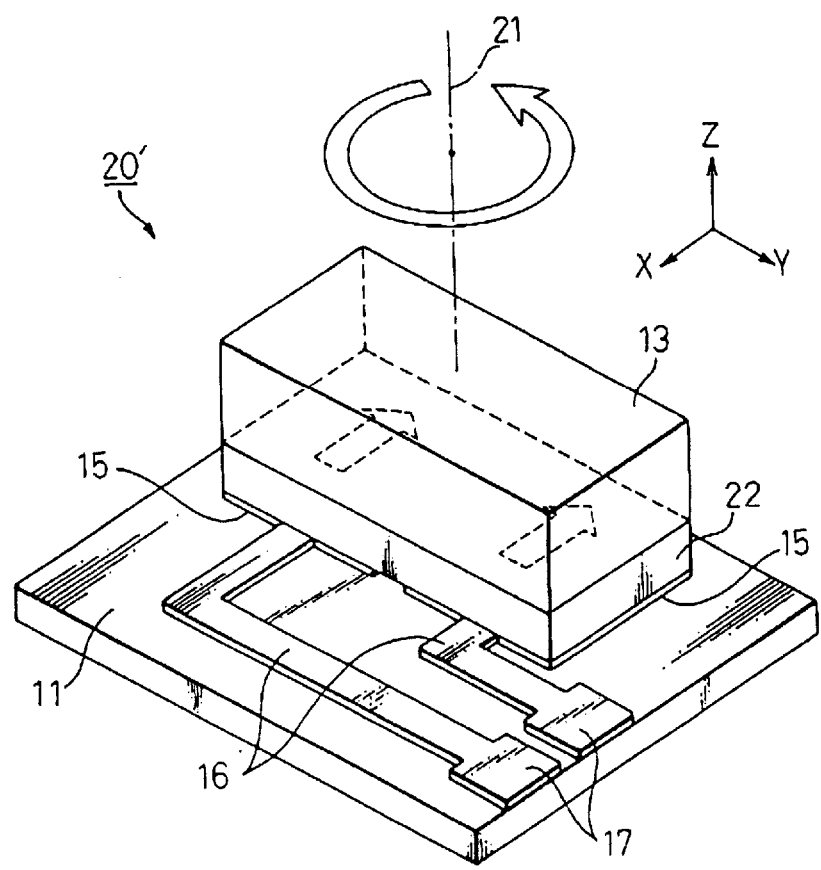
FIG. 8 is a perspective view which shows the overall configuration and acceleration detection directions of variation of an acceleration sensor according to the second embodiment of the present invention.

FIG. 7 is an exploded perspective view which shows the configuration of an acceleration sensor variation 20' according to the second embodiment of the present invention, and FIG. 8 is a perspective view which shows the overall configuration of the acceleration sensor 20' according to the second embodiment of the present invention after assembly and the acceleration detection directions.

The acceleration sensor 20' variation of the second embodiment of the present invention differs from the acceleration sensor 20 according to the same second embodiment only in that the two mutually parallel shear-type piezoelectric elements in the acceleration sensor 20 which have polarization directions within their plane, which is parallel to the substrate 11, are replaced by a single piezoelectric element in the acceleration sensor 20'. Although there is only one shear-type piezoelectric element provided in the acceleration sensor 20' of this embodiment, it is substantially the same as if two shear-type piezoelectric elements 12 were provided. An advantage that this embodiment affords is that it is only necessary to have one piezoelectric element 22, thereby reducing the number of parts by one, providing a reduction in the labor required for assembly, and an improvement in sensitivity because of the use of a single piezoelectric element with uniform characteristics.

Figure 9:
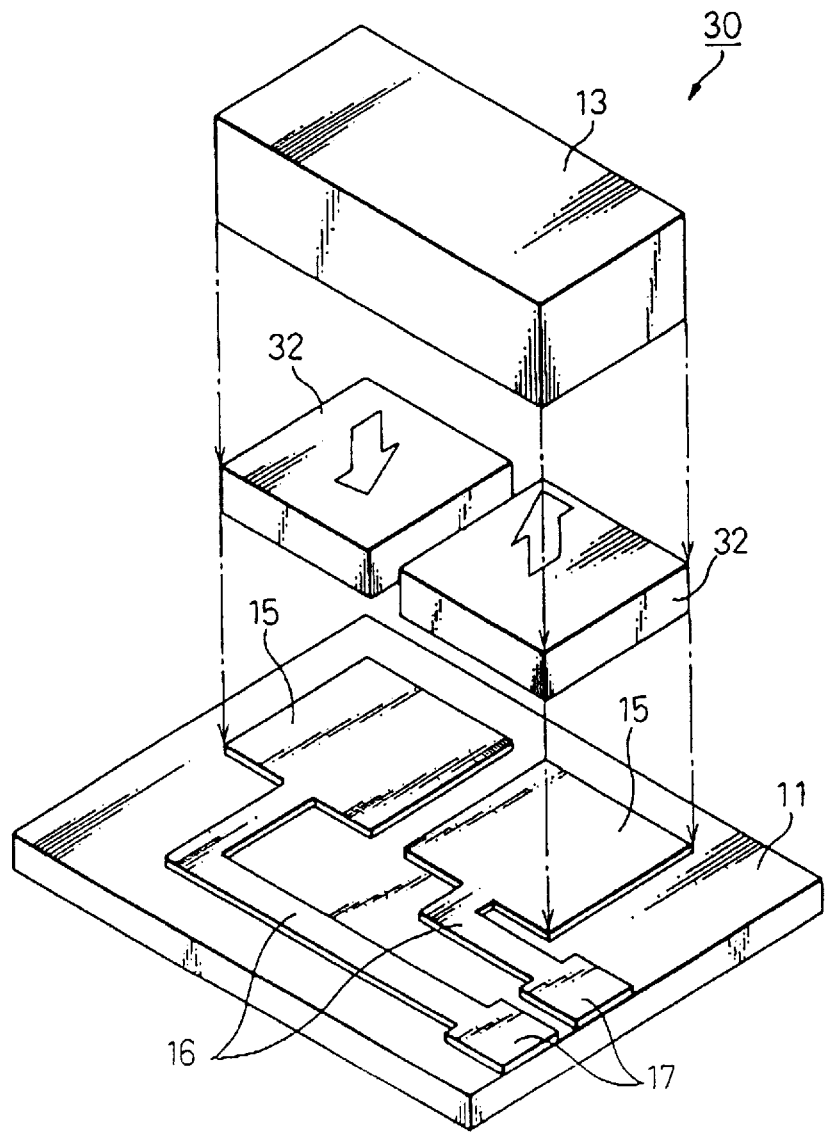
FIG. 9 is a perspective view which shows the configuration of an acceleration sensor according to the third embodiment of the present invention.
Figure 10:
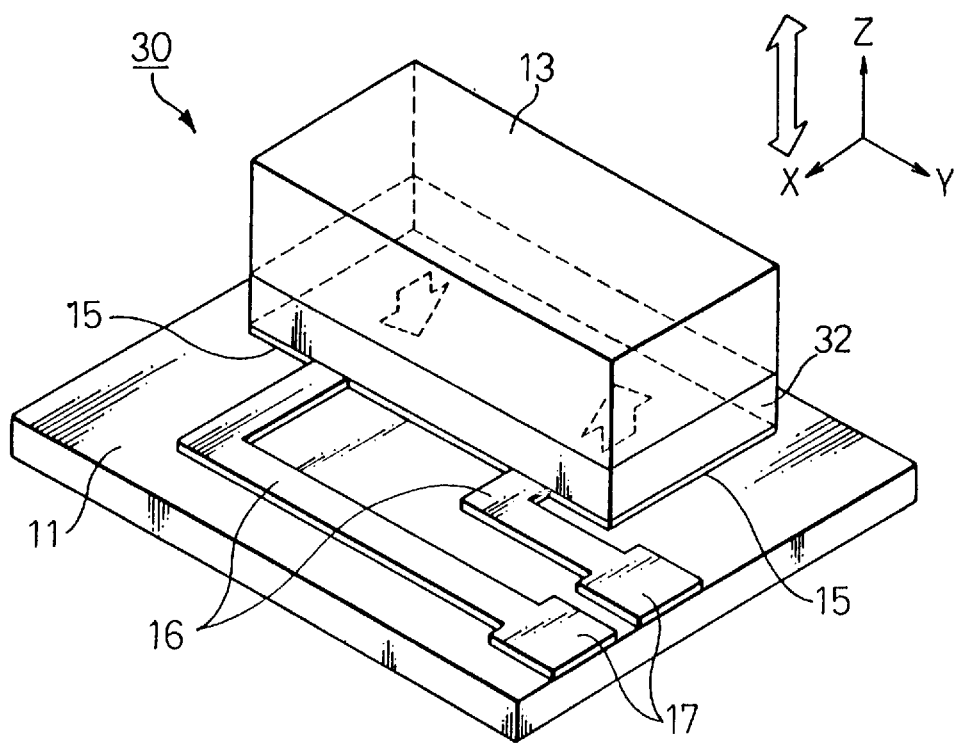
FIG. 10 is a perspective view which shows the overall configuration and acceleration detection directions of an acceleration sensor according to the third embodiment of the present invention.

FIG. 9 is an exploded perspective view which shows the configuration of an acceleration sensor 30 according to the third embodiment of the present invention, and FIG. 10 is a perspective view which shows the overall configuration of the acceleration sensor 30 according to the third embodiment of the present invention after assembly, and the acceleration detection directions.

Because the constituent elements of the acceleration sensor 30 are chiefly the same as the acceleration sensor 20 according to the second embodiment of present invention, the same reference symbols are applied to corresponding elements and the description of these elements will be omitted herein, a detailed description being provided of only those parts that differ from the second embodiment of the present invention.

In FIG. 9, which shows the configuration of the acceleration sensor 30 according to the third embodiment of the present invention, 11 is a substrate, 32 are compression-type piezoelectric elements, 13 is a weight, 15 are conductive rectangles, 16 are conductive lines, and 17 are electrodes.

The acceleration sensor 30 according to the third embodiment differs from the acceleration sensor 20 of the second embodiment in that it uses compression-type piezoelectric elements 32 instead of the shear-type piezoelectric elements 12. In the acceleration sensor 20 of the second embodiment, the polarization directions of each of the shear-type piezoelectric elements 12 are within the planes of elements which are parallel to the substrate 11 and mutually parallel, whereas in the acceleration sensor 30 according to the third embodiment, the polarization directions of two compression-type piezoelectric elements 32 are disposed in the thickness direction of the elements, which is perpendicular to the substrate 11, and the directions are mutually opposite.

In the acceleration sensor 30 according to this embodiment, as shown in FIG. 10, the two compression-type piezoelectric elements 32, which have polarization directions that are disposed in the thickness direction of the element, are electrically connected by means of the weight 13. Therefore, the direction in which the acceleration sensor 30 of this embodiment can detect acceleration is the Z-axis direction, which is perpendicular to the substrate 11. That is, the acceleration sensor 30 according to the third embodiment of the present invention can detect acceleration that travels in the up-and-down direction, the sensitivity being high as a result of the doubled output.

Figure 11:
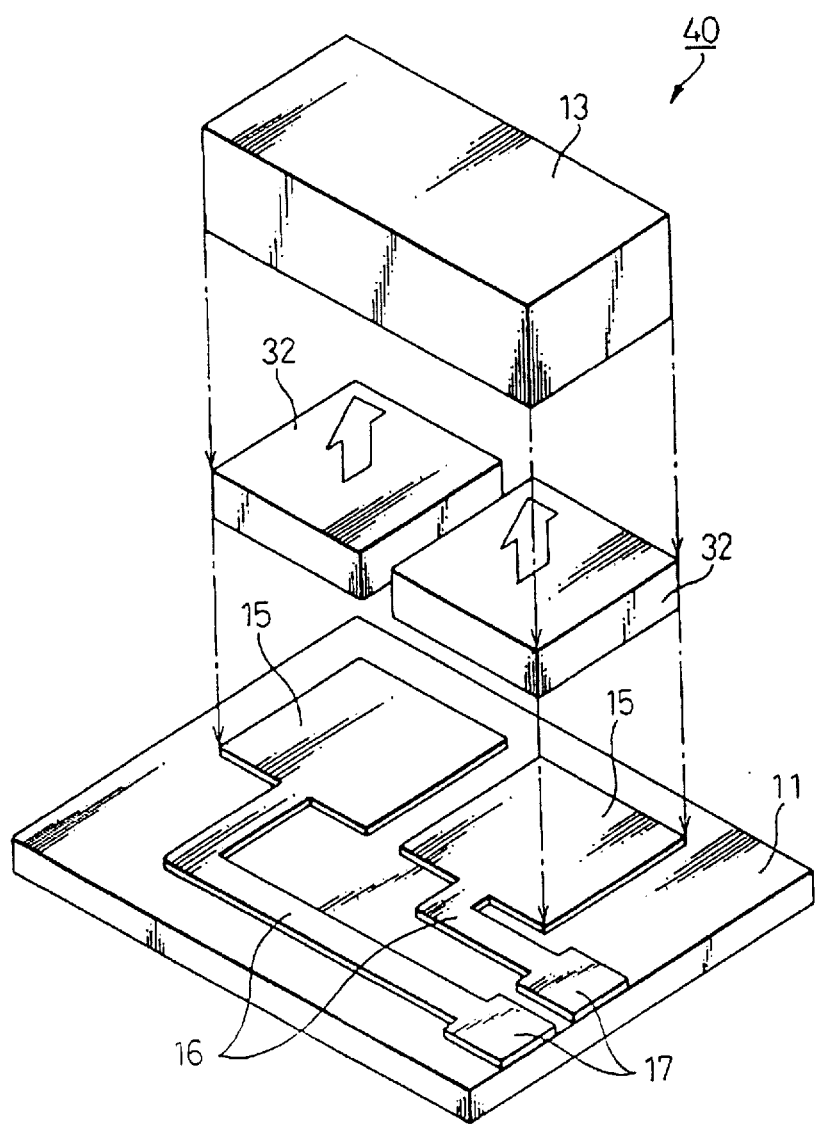
FIG. 11 is a perspective view which shows the configuration of an acceleration sensor according to the fourth embodiment of the present invention.
Figure 12:
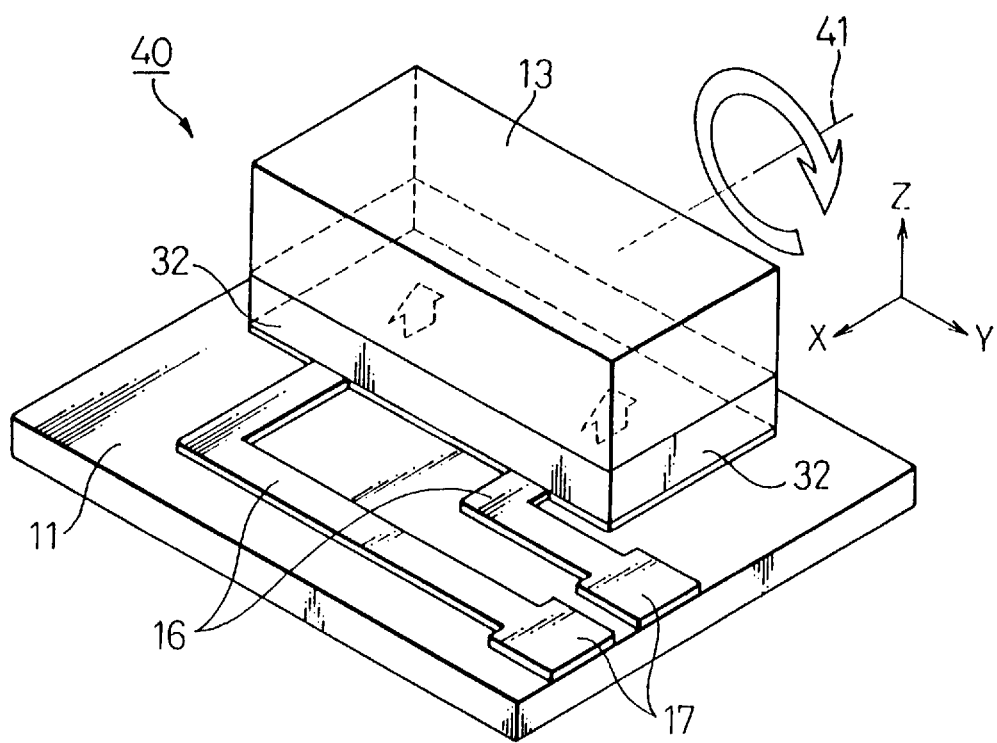
FIG. 12 is a perspective view which shows the overall configuration and acceleration detection directions of an acceleration sensor according to the fourth embodiment of the present invention.

FIG. 11 is an exploded perspective view which shows the configuration of an acceleration sensor 40 according to the fourth embodiment of the present invention, and FIG. 12 is a perspective view which shows the overall configuration of the acceleration sensor 40 according to the fourth embodiment of the present invention after assembly, and the acceleration detection directions.

Because the constituent elements of the acceleration sensor 30 are chiefly the same as the acceleration sensor 30 according to the third embodiment of present invention, the same reference symbols are applied to corresponding elements and the description of these elements will be omitted herein, a detailed description being provided of only those parts that differ from the second embodiment of the present invention.

In FIG. 11, which shows the configuration of the acceleration sensor 40 according to the fourth embodiment of the present invention, 11 is a substrate, 32 are compression-type piezoelectric elements, 13 is a weight, 15 are conductive rectangles, 16 are conductive lines, and 17 are electrodes.

The acceleration sensor 40 according to the fourth embodiment differs from the acceleration sensor 30 of the third embodiment only with regard to the polarization direction of the compression-type piezoelectric elements. Whereas in the acceleration sensor 30 according to the third embodiment, the polarization directions of each of the compression-type piezoelectric elements are in the thickness direction of the elements, which is perpendicular to the substrate 11 and mutually opposite one another, in the acceleration sensor 40 of the fourth embodiment, the polarization directions of each of the compression-type piezoelectric elements are in the thickness direction of the elements and in the same direction.

In an acceleration sensor 40 according to this embodiment, as shown in FIG. 12, the two piezoelectric elements 32, which have polarization directions which are in the thickness direction of the elements, are electrically connected by means of the weight 13. Therefore, the direction in which the acceleration sensor 40 of this embodiment can detect acceleration is the rotational direction about the X-axis directed axis 41, which is parallel with respect to the substrate 11.

In the acceleration sensors 30 and 40 according to the third and fourth embodiment, it is possible to have a variation, as was the case with the embodiment variation 20' of the second embodiment 20, in which the two piezoelectric elements are replaced by a single piezoelectric element.

Figure 13:
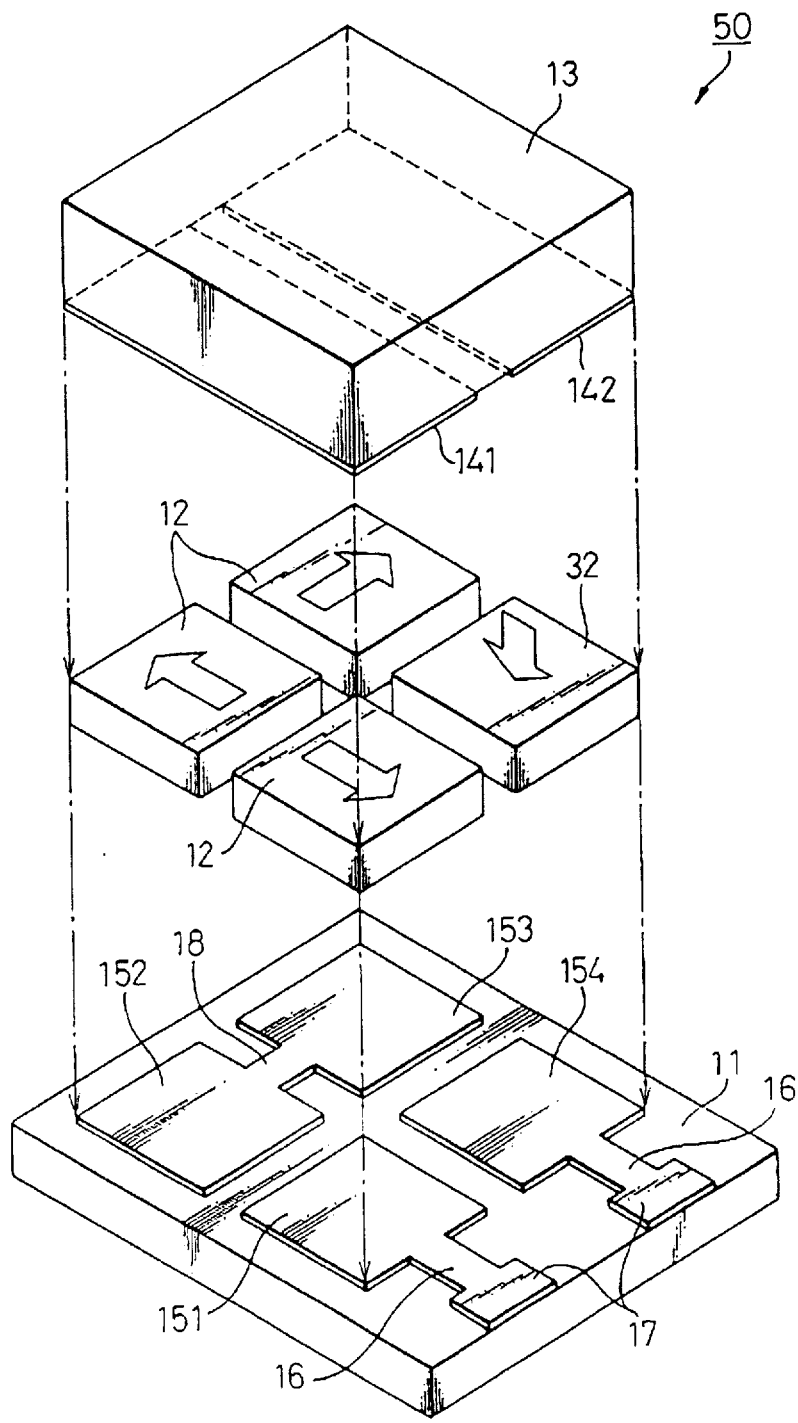
FIG. 13 is a perspective view which shows the configuration of an acceleration sensor according to the fifth embodiment of the present invention.

FIG. 13 is an exploded perspective view which shows the configuration of an acceleration sensor 50 according to the fifth embodiment of the present invention, in which the same reference symbols have been applied to elements which are the same as in the foregoing first to fourth embodiments.

In the fifth embodiment, four conductive areas 151 through 154 are formed in a matrix arrangement on the top of the substrate 11, with two electrodes 17 formed at the edge of the substrate 11. The two conductive areas 151 and 154 are connected to the electrodes 17 by means of the conductive lines 16, the remaining two conductive areas 152 and 153 being connected to one another by the conductive line 18. Three rectangularly shaped shear-type piezoelectric elements 12 and one rectangularly shaped compression-type piezoelectric element 32, these having bottom surfaces which are approximately the same shape as the conductive areas 151 through 154, are mounted on top of the conductive areas 151 through 154.

In this embodiment, the polarization directions of the three shear-type piezoelectric elements 12 are within the planes of the elements, which are parallel to the substrate 11, and the directions are all mutually different, and the one polarization direction of the one compression-type piezoelectric element 32 is in the thickness direction of the element, which is perpendicular with respect to the substrate 11. A weight 13 is mounted on top of these piezoelectric elements 12 and 32 in a manner such that it straddles the piezoelectric elements 12 and 32. In this embodiment, the weight 13 is formed from an insulating material, a first conductor 141, which connects conductive areas 151 and 152 is formed on top of the conductive areas 151 and 152, and a second conductor 142, which connects conductive areas 153 and 154, is on top of the conductive areas 153 and 154.

Therefore, in the acceleration sensor 50 according to the fifth embodiment, all four piezoelectric elements 12 and 32 are connected in series, and the acceleration sensor 50 is capable of detecting acceleration which is either in the directions of the X, Y, and Z axes or rotational about these three axes. Also, because there are a plurality of piezoelectric elements having polarization directions that are aligned along one and the same axis, it is possible to improve the detection sensitivity in that direction. In addition, it is also possible to take either the sum or the difference between piezoelectric elements, in order to isolate the acceleration in a particular direction.

Figure 14:
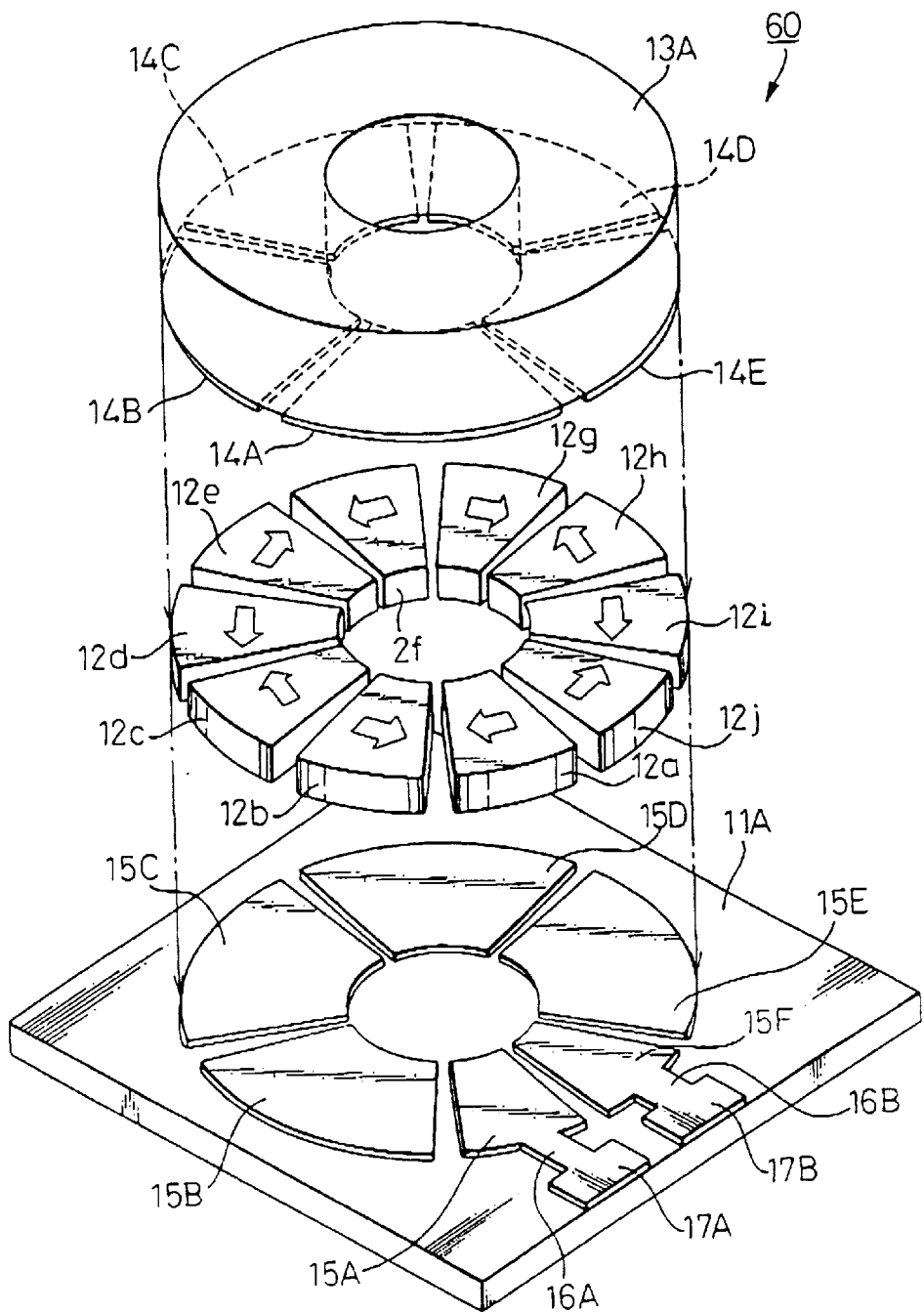
FIG. 14 is a perspective view which shows the configuration of an acceleration sensor according to the sixth embodiment of the present invention.

FIG. 14 is an exploded perspective view which shows the configuration of an acceleration sensor 60 according to the sixth embodiment of the present invention. In the sixth embodiment, a weight 13A is made from an insulating material, its shape being toroidal. Five fan-shaped conductors 14A through 14E, which evenly divide the ring shape into five parts are independently provided on the bottom surface of the ring-shaped weight 13A. On the bottom surface of the weight 13A are provided 10 shear-type piezoelectric elements 12a through 12j, arranged in a ring and with a uniform spacing. These ten piezoelectric elements 12a through 12j are fan-shaped, so as to evenly divide the ring shape of the weight 13A, and the polarization directions of these ten piezoelectric elements are all parallel to weight 13A and arranged in directions tangential to a circle located in the plane of these directions, with neighboring polarization directions being mutually opposite in their direction along the above-noted tangent lines. Of these ten piezoelectric elements 12a through 12j, piezoelectric elements 12a and 12b are electrically connected by means of a conductor 14A, piezoelectric elements 12c and 12d are electrically connected by means of a conductor 14B, piezoelectric elements 12e and 12f are electrically connected by means of a conductor 14C, piezoelectric elements 12g and 12h are electrically connected by means of a conductor 14D, and piezoelectric elements 12i and 12j are electrically connected by means of a conductor 14E, these conductors being provided on the bottom surface of the weight 13A so as to make these connections.

Four fan-shaped conductive areas 15B through 15B and two fan-shaped conductive areas 15A and 15F, each being a shape that is one half of the fan shapes of each of the conductive areas 15B through 15E, are formed on the top of the substrate 11A. Two electrodes 17A and 17B are formed on the edge of the substrate 11A, these two electrodes 17A and 17B being connected to the outside part of the fan shaped conductive areas 15A and 15F, respectively, by means of the extension conductive lines 16A and 16B.

The ten piezoelectric elements 12a through 12f are placed on the top of the conductive areas 15A through 15F so that piezoelectric element 12j is positioned over the conductive area 15F. As a result, the piezoelectric elements 12a through 12j are electrically connected in series by means of conductors 14A through 14F and conductive areas 15A through 15F, the potential developing across these series connected piezoelectric elements being led to the electrodes 17A and 17B by means of the conductive areas 15A and 15F via conductive lines 16A and 16B.

Therefore, the acceleration sensor 60 according to the sixth embodiment has all ten piezoelectric elements 12a through 12j connected in series, and is capable of detecting acceleration in a rotational direction about the Z axis of the weight 13A.

Furthermore, while the above explanation is for the case in which the weight 13A is ring-shaped, there is no limitation to this shape, and it can be a circle or a polygon as well.

Figure 15A:
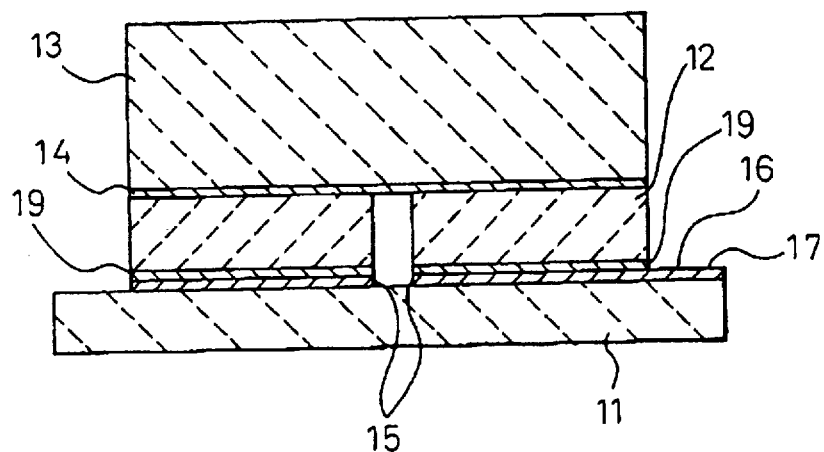
FIG. 15A is a cross-sectional view which shows an example of the method of connection of the substrate, the piezoelectric element, and the weight in an-acceleration sensor according to the present invention, for the case in which the weight is an insulator.
Figure 15B:
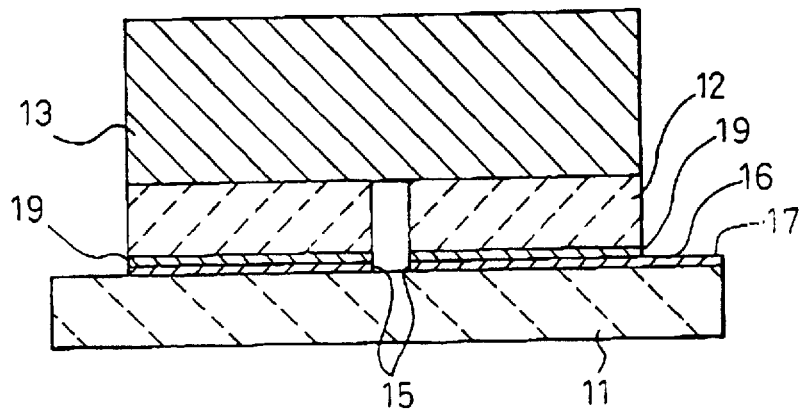
FIG. 15B is a cross-sectional view which shows an example of the method of connection of the substrate, the piezoelectric element, and the weight in an acceleration sensor according to the present invention, for the case in which the weight is a conductor.

FIG. 15A and FIG. 15B illustrate an example of the method of making connections to the substrate, piezoelectric elements, and weight of acceleration sensors 10 through 60 in the above-described embodiments, with 15A showing the cross-sectional view in the case in which the weight is an insulating material, and FIG. 15B showing the cross-sectional view in the case in which the weight is a conducting material. In these drawings, 11 is the substrate, 12 is a piezoelectric element, 13 is the weight, 14 is a conductor, 15 is a conductive area, 16 is a conductive extension line, and 17 is an electrode. As shown in FIG. 15A and FIG. 15B, in the acceleration sensors 10 through 60 in the above-described embodiments, it is possible to connect the piezoelectric element 12 and the conductive area 15 either by a solder layer or by the conductive adhesive 19.

Figure 16A:
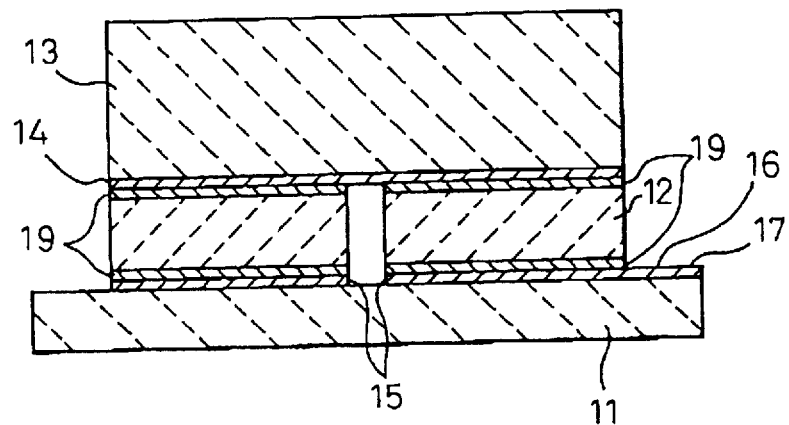
FIG. 16A is a cross-sectional view which shows a different example of the method of connection of the substrate, the piezoelectric element, and the weight in an acceleration sensor according to the present invention, for the case in which the weight is an insulator.
Figure 16B:
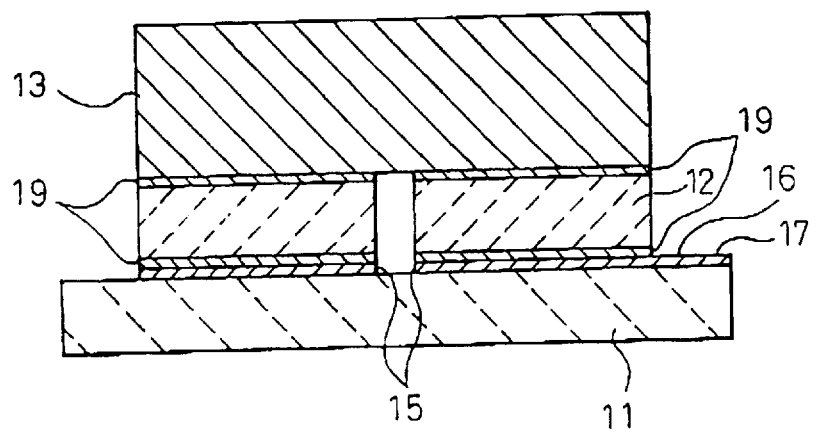
FIG. 16B is a cross-sectional view which shows a different example of the method of connection of the substrate, the piezoelectric element, and the weight in an acceleration sensor according to the present invention, for the case in which the weight is a conductor.

FIG. 16 shows two different examples of the method of making connections to the substrate, the piezoelectric element, and the weight in the acceleration sensors 10 through 60 in the above-described embodiments, 16A showing the cross-sectional view in the case in which the weight is an insulating material, and FIG. 16B showing the cross-sectional view in the case in which the weight is a conducting material. In these drawings, 11 is the substrate, 12 is a piezoelectric element, 13 is the weight, 14 is a conductor, 15 is a conductive area, 16 is a conductive extension line, and 17 is an electrode. As shown in FIG. 16A and FIG. 16B, in the acceleration sensors 10 through 60 in the above-described embodiments, it is possible to connect the piezoelectric element 12 and the conductive area 15 either by a solder layer or by the conductive adhesive 19, and it is it possible to connect the piezoelectric element 12 and conductor 14 or the piezoelectric element 12 and the weight 13 either by a solder layer or by the conductive adhesive 19.

Figure 17:
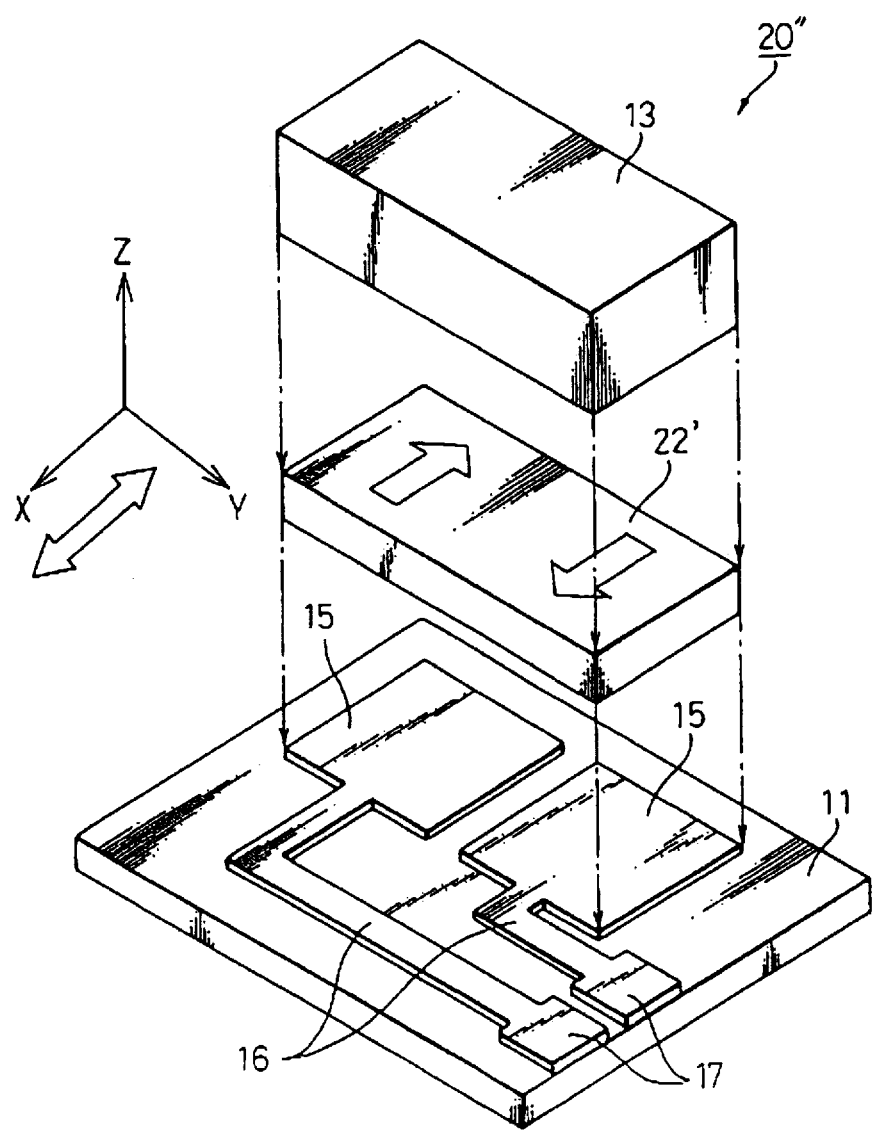
FIG. 17 is a perspective view which shows the configuration of an acceleration sensor according to the seventh embodiment of the present invention.

FIG. 17 is an exploded perspective view which shows the configuration of an acceleration sensor 20" according to an embodiment variation of the seventh embodiment of the present invention.

The acceleration sensor 20" of the seventh embodiment is an example of a variation of the acceleration sensor 20' which is shown in FIG. 7, and it differs from the acceleration sensor 20' only with regard to the polarization direction. In the acceleration sensor 20' of the embodiment shown in FIG. 7, the polarization directions of the piezoelectric element 22 are within the plane of the element which is parallel to the substrate 11 and are facing the same direction. In the acceleration sensor 20" of the seventh embodiment, however, the polarization directions of the-piezoelectric element 22' are within the plane of the element which is parallel to the substrate 11, but they are in opposing directions. Although there is only a single shear-type piezoelectric element 22' provided in the acceleration sensor 20" of this embodiment, it is substantially the same as if two shear-type piezoelectric elements 12 were provided, its operation and acceleration detection directions being as shown in the drawing. An advantage provided by this embodiment variation is that it is only necessary to have one piezoelectric element 22', thereby reducing the number of parts by one, providing a reduction in the labor required for assembly, and an improvement in sensitivity because of the use of a single piezoelectric element with uniform characteristics.

Figure 18:
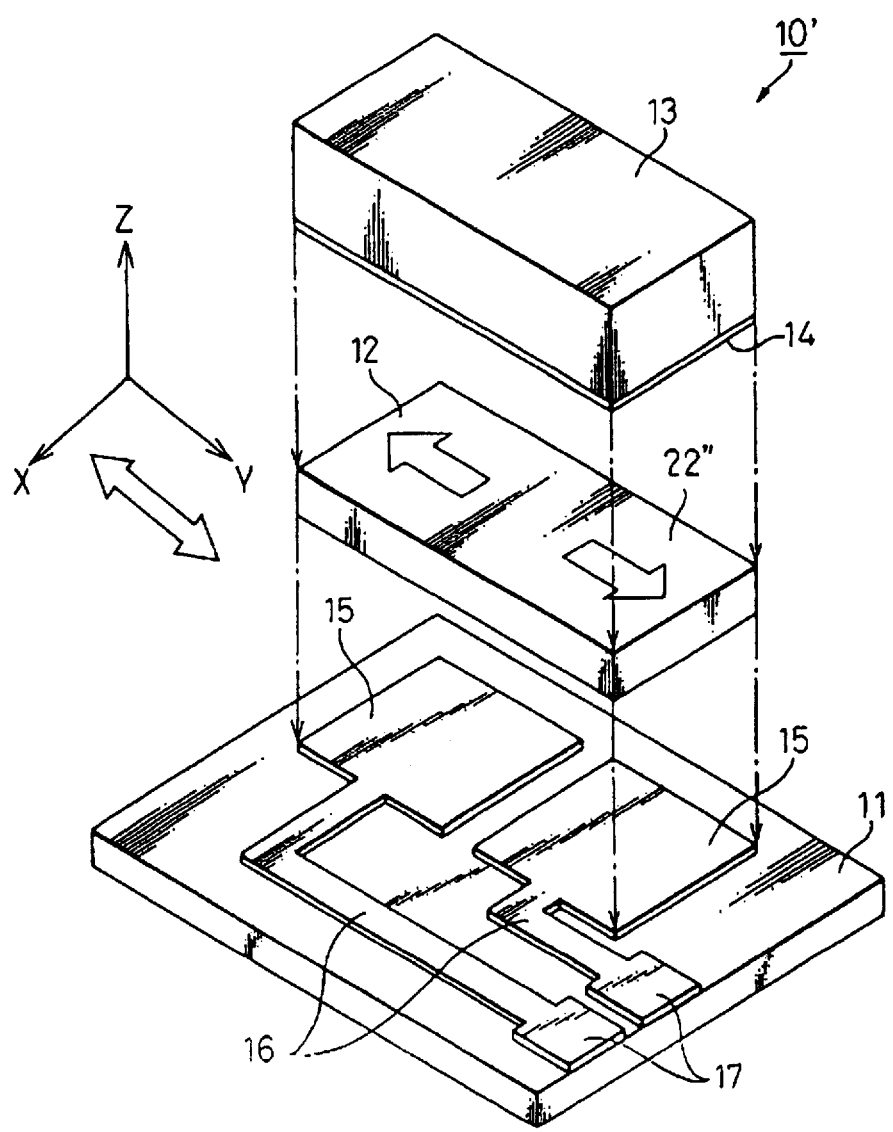
FIG. 18 is a perspective view which shows the configuration of an acceleration sensor according to the seventh embodiment of the present invention.

FIG. 18 is an exploded perspective view which shows the configuration of an acceleration sensor 10' according to an embodiment variation of the first embodiment of the present invention, which was illustrated by and described with reference to FIG. 3.

The acceleration sensor 10' according to an embodiment variation of the first embodiment of the present invention differs from the acceleration sensor 10 of the first embodiment only in that instead of two shear-type piezoelectric elements in which the polarization directions are within the plane of the element parallel to the substrate 11 and mutually parallel, in the cross-sectional view 10' there is just one shear-type piezoelectric element. In the acceleration sensor 10' of this embodiment, although there is only one shear-type piezoelectric element 22" provided, its operation and acceleration detection directions are precisely the same as the acceleration sensor 10 of the first embodiment. An advantage provided by this embodiment variation is that it is only necessary to have one piezoelectric element 22", thereby reducing the number of parts by one, providing a reduction in the labor required for assembly, and an improvement in sensitivity because of the use of a single piezoelectric element with uniform characteristics.

According to the present invention, because a weight connection means is used to electrically connect in series a plurality of piezoelectric elements, the potential developing across these series connected piezoelectric elements is brought out to electrodes provided on the substrate, and in addition to simplifying and making the acceleration sensor thin, the thus obtained voltage has a high S/N ratio. As a result, the acceleration sensor according to the present invention is ideal for use as an acceleration sensor in the magnetic disk drive of a portable computer equipment.

Note that the piezoelectric element is polarized by the followings method.

(1) When the piezoelectric element has a single polarization direction.
  (a) Two electrodes for polarization are attached on top surfaces at both sides of a ceramic green sheet.
  (b) High voltage is applied between the two electrodes to polarize the ceramic green sheet.
  (c) Both sides of the polarized green sheet are cut off to obtain a piezoelectric element having a uniform polarization direction.

(2) When the piezoelectric element has two polarization directions.
  (a) Two electrodes are attached on top surfaces at both sides of a ceramic green sheet and one electrode is attached on the bottom surface at a center portion of the ceramic green sheet as a common electrode.

(b) a pair of the same high voltages are applied between the center common electrode on the bottom surface and the two electrodes on the top surface of the green sheet to form two different polarization directions on the ceramic green sheet.

(c) Both sides of the polarized green sheet are cut off and the center common electrode is detached to obtain a piezoelectric element having two different polarization directions.

What is claimed is:

1. An acceleration sensor comprising:

a substrate;

first and second electrodes separately provided on said substrate;

a single piezoelectric element having first and second regions, said first region being provided on said first electrode and polarized in a first direction, and said second region being provided on said second electrode and polarized in a second direction parallel to the first direction;

electrical connection means provided on said single piezoelectric element for electrically connecting said first region and said second region; and weight means provided on said electrical connection means.

2. An acceleration sensor according to claim 1, wherein the first direction of said first region is parallel to a plane of said substrate and perpendicular to a hypothetical line formed by said first and second electrodes, and the second direction of said second region is the same direction as the first direction, whereby said acceleration sensor detects an acceleration acting in the direction of rotation about an axis that is perpendicular to the plane of said substrate.

3. An acceleration sensor according to claim 1, wherein the first direction of said first region is perpendicular to a plane of said substrate, and the second direction of said second region is the opposing direction of the first direction, whereby said acceleration sensor detects an acceleration acting in the direction perpendicular to the plane of said substrate.

4. An acceleration sensor according to claim 1, wherein the first direction of said first region is perpendicular to a plane of said substrate, and the second direction of said second region is the same direction of the first direction, whereby said acceleration sensor detects an acceleration acting in the direction of rotation about an axis that is parallel to the plane of said substrate and perpendicular to a hypothetical line formed by said first and second electrodes.

5. An acceleration sensor according to claim 1, wherein the first direction of said first region is parallel to a plane of said substrate and perpendicular to a hypothetical line formed by said first and second electrodes, and the second direction of said second region is the opposing direction of the first direction, whereby said acceleration sensor detects an acceleration acting in the direction perpendicular to the hypothetical line.

6. An acceleration sensor according to claim 1, wherein the first direction of said first region is parallel to a plane of said substrate and parallel to a hypothetical line combining said first and second electrodes, and the second direction of said second region is the opposing direction of the first direction, whereby said acceleration sensor detects an acceleration acting in the direction parallel to the hypothetical line.

7. An acceleration sensor according to claim 2, wherein said weight means is made of an insulating material.

8. An acceleration sensor according to claim 1, wherein said weight means is singly formed with said electrical connection means.

* * * * *